United States Patent Office 3,242,187
Patented Mar. 22, 1966

3,242,187
CERTAIN 3-POLYOXYALKYLENE-2-OXAZOLIDI-
NONES AND THEIR PREPARATION
Richard A. Hickner, Midland, Mich., and Donald W.
Bolme, Pullman, Wash., assignors to The Dow Chemical Company, Midland, Mich., a corporation of Delaware
No Drawing. Filed Nov. 4, 1963, Ser. No. 321,350
17 Claims. (Cl. 260—307)

This application is a continuation-in-part of our copending application, Serial No. 38,452, filed June 24, 1960, and now abandoned.

This invention relates to certain 2-oxazolidinones as new chemical compounds, and to methods for preparing these novel compounds.

The particular 2-oxazolidinones claimed are those having the formula:

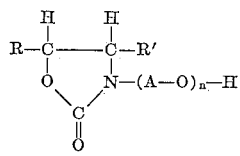

wherein R and R' are independently hydrogen, phenyl or lower alky, —(A—O)$_n$— is a polyoxyalkylene group wherein each oxyalkylene group, A—O, is derived from alkylene oxide selected from the group consisting of ethylene oxide, propylene oxide, butylene oxides, amylene oxides, styrene oxide, and epichlorohydrin, and $n$ is an integer from 1 to about 25 when A is a butylene group and from 2 to about 25 when A represents any of the remaining alkylene groups disclosed above. A preferred sub-genus is that wherein R, R' and A—O have the same significance as above and $n$ is a number from 5 to about 25.

According to one method of the present invention, 2-oxazolidinones wherein R and R' have the values as hereinbefore assigned, A is a butylene group and $n$ is 1 are conveniently prepared by reacting a 2-oxazolidinone having the formula:

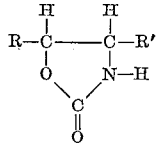

wherein R and R, have the same values as above, with about one mole per mole of oxazolidinone, of a butylene oxide. The oxazolidinone and butylene oxide are suitably allowed to react at a temperature of 90–180° C. and a pressure of 2–10 atmospheres, preferably at 110–145° C. and 3–5 atmospheres. Normally two to four hours are required for completion of the reaction, after which any unreacted oxide is conveniently removed from the reaction vessel by reducing the pressure to subatmospheric. The 2-oxazolidinone product may be purified by distillation, if desired.

According to a second method of the present invention, 2-oxazolidinones wherein R, R' and A have the same values as hereinbefore assigned and $n$ is from 2 to about 25 are conveniently prepared by reacting a 2-oxazolidinone having the formula:

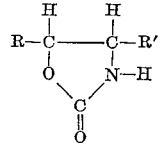

wherein R and R' have the values previously disclosed, with (1) from 2 to about 35 moles, per mole of 2-oxazolidinone, of an alkylene oxide having the formula:

AO wherein A is as before defined, in the presence of from 0.1 to 10 percent by weight, based on the weight of the reactants, of a strong alkaline catalyst; the reaction is suitably carried out at a temperature of 90–180° C. and at a pressure of 2–10 atmospheres, preferably at 110–145° C. and 3–5 atmospheres. Suitable alkaline catalysts for the reaction include alkali metal hydroxides, an alkali metal salt of the oxazolidinone, and a quaternary ammonium hydroxide. Normally two to four hours are required for completion of the reaction; when the reaction is completed, any unreacted alkylene oxide can be removed under reduced pressure and the 2-oxazolidinone product neutralized by suitable means, such as, for example, with acetic acid.

The 2-oxazolidinones of the present invention wherein $n$ is 2 to about 25 include compounds wherein a single alkylene oxide is used as a reactant, in addition to those wherein two or more oxides are reacted, either in a random or a block-polymer manner, and where the order of addition of the oxides is immaterial.

The compounds of the present invention possess useful and unexpected properties, particularly those compounds wherein $n$ is from 5 to about 25. For example, by varying the type and amount of oxide a novel class of nonionic surface active agents can be produced. Also, a class of polyvinyl chloride plasticizers result from the addition of at least two oxypropylene groups, or from one to several oxybutylene groups, to the 2-oxazolidinone. In addition, the 2-oxazolidinones having from 10 to 20 moles of alkylene oxide per mole of oxazolidinone are useful as lubricants. There are shown in Table I the surface active properties of several of the polyoxyalkyleneoxazolidinones, prepared by the method of the present invention. All of the surfactant properties shown in Table I were determined on 0.1 percent aqueous solutions, prepared by dissolving 0.5 gram of the oxazolidinone in 500 ml. of distilled water.

TABLE I

| Type and Number of Moles of Oxide[1] Reacted with 5-Methyl-2-Oxazolidinone | Surface Tension, dynes/sec. | Interfacial Tension with Mineral Oil, dynes/sec. | Wetting Time,[2] min. |
|---|---|---|---|
| Water | 72 | 40 | >15 |
| 5 E.O. plus 5 P.O.[3] | 46.3 | 17.3 | 15 |
| 5 E.O. plus 5 B.O.[3] | 38.9 | 11.0 | 6.4 |
| 5 B.O. | 41.8 | 11.3 | 15 |
| 10 P.O. | 39.2 | 14.1 | 3.2 |
| 15 P.O. | 40.1 | 13.4 | 1.9' |

[1] EO, PO and BO are, respectively, ethylene, propylene and 1,2-butylene oxides.
[2] Draves Wetting Time Synthron Tape Modification Test.
[3] Block polymers of the respective alkylene oxides.

In each of a series of experiments, 50 grams of polyvinyl chloride, 2.5 grams of Paraplex G–62 (an epoxidized soybean oil plasticizer, Rohm and Haas Co., Philadelphia, Pa.), 1.5 grams of Ferro 1825 (a barium-cadminum stabilizer, Ferro Chemical Corp.), 25 grams of calcium carbonate, 1.5 grams of titanium dioxide, and 32.5 grams of the polyoxyalkyleneoxazolidinone were mixed thoroughly and then milled. There are shown in Table II the tensile strength, percent elongation, and Shore A Hardness of the films prepared from the resultant plasticized resin.

TABLE II

| Type and Number of Moles of Oxide Reacted with 5-Methyl-2-Oxazolidinone | Tensile Strength, lbs./sq. in. | Percent Elongation | Shore A Hardness |
|---|---|---|---|
| 5 P.O | 2,430 | 514 | 75 |
| 5 E.O. plus 5 P.O | 2,250 | 400 | 75 |
| 5 E.O. plus 5 B.O | 2,250 | 512 | 74 |
| 5 B.O | 2,240 | 491 | 74 |
| 8 B.O | 2,080 | 304 | 78 |

In addition, films were prepared using as the plasticizer, the following oxyalkylene or polyoxyalkylene derivatives of 5-methyl-2-oxazolidinone:

(1) 3(2-hydroxybutyl)
(2) 3(2-polyoxypropylene)—containing 2.4 oxypropylene groups
(3) 3(2-polyoxypropylene)—containing 2.9 oxypropylene groups
(4) 3(2-polyoxypropylene)—containing 4.2 oxypropylene groups Each of the films so prepared formed clear homogeneous sheets with no evidence of exudation of the plasticizer within one week after the films were prepared.

In contrast to the excellent results obtained above, 3(2-hydroxyethyl)-, 3(2-hydroxyethyl)-5-methyl-, and 3(2-hydroxypropyl) - 5 - methyl - 2 - oxazolidinones, when evaluated as plasticizers using the same technique, exhibited undesirable results. The 3(2-hydroxyethyl)-2-oxazolidinone was found to be immiscible with the polyvinyl chloride, and thus was completely inoperable. The 3(2 - hydroxyethyl) - 5 - methyl - 2 - oxazolidinone mixed with the polyvinyl chloride, but did not form a homogeneous sheet. The 3(2-hydroxypropyl)-5-methyl-2-oxazolidinone formed a clear homogeneous sheet, but the molding exuded plasticizer badly within a few hours after preparation of the molding.

The compounds of the present invention have utility as plasticizers for cellulose acetate. For example, 3(2-hydroxybutyl) - 5 - methyl - 2 - oxazolidinone and 3(2-oxybutylene)$_5$-5-methyl-2-oxazolidinone were used separately as plasticizers for preparing films and each of the films produced were clear and flexible and exhibited good tensile strength.

The novel compounds also possess utility as nematocides, showing a high rate of kill of the rootknot nematode. This utility was easily demonstrated by mixing a nematode suspension with aerated distilled water, buffering with K$_2$HPO$_4$ and adding this buffered suspension to a diluted acetone solution or dispersion of the compound to be tested. After a prescribed period of incubation the percent kill of the namatode was determined.

The practice of the present invention is further illustrated by a series of experiments in which 5-methyl-2-oxazolidinone was reacted with one or more moles of one or more of the alkylene oxides hereinbefore disclosed. The temperature for the reactions was maintained in all cases between 125–135° C., the pressure did not exceed 65 p.s.i. gauge and the reactions were completed in 2–4 hours. There are shown in Table III the type and number of mole of alkylene oxide used per mole of 5-methyl-2-oxazolidinone, physical properties and yields of the products based on the starting materials.

TABLE III

| Type and No. of Moles of Oxide | $n_D^{25}$ | B.P., ° C. | Sp. Gr., 100/4 | Yield, Percent |
|---|---|---|---|---|
| 2.4 P.O | 1.4617 | 190/0.15 mm | | |
| 2.9 P.O | 1.4614 | 190–210/0.11 mm | | |
| 3.7 P.O | 1.4610 | 210–230/0.11 mm | | |
| 4.2 P.O | 1.4605 | 230–250/0.11 mm | | |
| 10 P.O | | | 1.0186 | 96 |
| 15 P.O | | | 1.0108 | 92 |
| 3 B.O | | | 1.0100 | |
| 4.1 B.O | 1.4603 | 220–225/0.5 mm | | |
| 5.2 B.O | 1.4593 | 240–250/0.5 mm | | |
| 6.2 B.O | 1.4581 | 270–280/0.5 mm | | |
| 6.7 B.O | 1.4579 | 300–310/0.5 mm | | |
| 7.6 B.O | 1.4590 | | | |
| 5.0 E.O and 1.5 S.O.[2] | | | | 80 |
| 5.0 E.O. and 5.0 P.O.[2] | | | | 92 |

[1] Styrene oxide.
[2] Block polymers.

In addition to the novel compounds hereinbefore disclosed, other substituted 2-oxazolidinones within the scope of the present invention may be prepared in a similar manner, such as, for example, the 5-ethyl compound wherein A is the ethylene group and $n$ is 10; the 4-methyl-5-butyl compound wherein A is the propylene group and $n$ is 20; the 4-phenyl-5-propyl compound wherein A is the 1,2-butylene group and $n$ is 15; the 4-propyl compound wherein A is the propylene group and $n$ is 20; the compound wherein R is hydrogen, A is 3-chloro-1,2-propylene and $n$ is 15; also, the compound having block or random substitution, such as those where 5 oxyethylene groups are followed by 10 oxypropylene groups; 10 oxypropylene groups are followed by 5 oxybutylene groups; 10 oxypropylene groups are followed by 10 oxybutylene groups followed by 5 oxyamylene groups; 5 oxyethylene groups are followed by 10 oxybutylene groups followed by 5 oxyethylene groups; 2 oxypropylene groups are followed by 5 oxyamylene groups followed by 3 oxypropylene groups followed by 2 oxybutylene groups, and in like manner, any number of oxyalkylene groups can be added in any sequence, until a total of about 25 groups have been added to the starting oxazolidinone.

We claim:
1. 2-oxazolidinones having the formula:

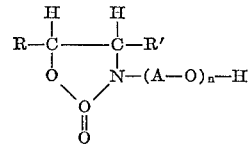

wherein R and R' are independently selected from the group consisting of hydrogen, phenyl, and lower alkyl, —(A—O)$_n$— is a polyoxyalkylene group wherein each oxyalkylene group, A—O, is derived from an alkylene oxide selected from the group consisting of ethylene oxide, propylene oxide, butylene oxides, amylene oxides, styrene oxide, and epichlorohydrin, and $n$ is a number from 1 to about 25 when A—O is derived from butylene oxides and $n$ is from 2 to about 25 when A—O is derived from any of said oxides except butylene oxides.

2. 2-oxazolidinones as in claim 1 wherein $n$ is a number from 5 to about 25.

3. 2-oxazolidinones as in claim 1 wherein R is lower alkyl, R' is hydrogen, and A is the ethylene group.

4. 2-oxazolidinones as in claim 1 wherein R is lower alkyl, R' is hydrogen, and A is the propylene group.

5. 2-oxazolidinones as in claim 1 wherein R is lower alkyl, R' is hydrogen, and A is the butylene group.

6. A 2-oxazolidinone as in claim 1 wherein A is the ethylene group, R is methyl, R' is hydrogen, and $n$ is 5.

7. A 2-oxazolidinone as in claim 1 wherein A is the propylene group, R is methyl, R' is hydrogen, and $n$ is 5.

8. A 2-oxazolidinone as in claim 1 wherein A is the propylene group, R is methyl, R' is hydrogen, and $n$ is 10.

9. A 2-oxazolidinone as in claim 1 wherein A is the propylene group, R is methyl, R' is hydrogen, and $n$ is 15.

10. A 2-oxazolidinone as in claim 1 wherein A is a butylene group, R is methyl, R' is hydrogen, and $n$ is about 5.

11. A 2-oxazolidinone as in claim 1 wherein (A—O) is a mixture of oxyethylene and phenyl oxyethylene groups, R is methyl, R' is hydrogen, and $n$ is about 7.

12. A 2-oxazolidinone as in claim 1 wherein (A—O) is a mixture of oxyethylene and oxypropylene groups, R is methyl, R' is hydrogen, and $n$ is about 10.

13. A 2-oxazolidinone as in claim 1 wherein (A—O) is a mixture of oxyethylene groups and oxybutylene groups, R is methyl, R' is hydrogen, and $n$ is about 10.

14. A method for preparing 2-oxazolidinones having the formula:

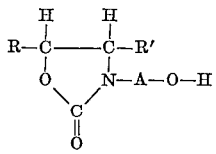

wherein R and R' are independently selected from the group consisting of hydrogen, phenyl, and lower alkyl, A is an alkylene group containing from 2 to 5 carbon atoms and optionally containing a substituent group selected from the class consisting of phenyl and chlorine, said process comprising contacting, at a temperature of 90–180° C. a 2-oxazolidinone having the formula:

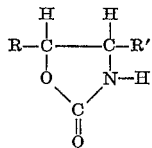

wherein R and R' are as defined above, with at least about one mole, per mole of said oxazolidinone, of an alkylene oxide containing from 2 to 5 carbon atoms and optionally containing substituent groups selected from the class consisting of phenyl and chlorine.

15. A method as in claim 14 wherein the reaction temperature is maintained at from 110–145° C.

16. A method for preparing 2-oxazolidinones having the formula:

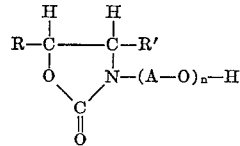

wherein R and R' are selected from the group consisting of hydrogen, phenyl, and lower alkyl, —(A—O)$_n$— is a polyoxyalkylene group wherein each oxyalkylene group, A—O, is derived from an alkylene oxide selected from the group consisting of ethylene oxide, propylene oxide, butylene oxides, amylene oxides, styrene oxide, and epichlorohydrin, and $n$ is an integer as defined in claim 1, said process comprising contacting, at a temperature of 90–180° C., one mole of a 2-oxazolidinone as defined in claim 14 with at least $n$ moles of an alkylene oxide containing from 2 to 5 carbon atoms and mixtures thereof, and optionally containing a substituent group selected from the class consisting of phenyl, halogen, and lower alkyl, said process being carried out in the presence of 0.1–10 percent by weight, based on the weight of the starting materials, of a strong alkaline catalyst.

17. A method as in claim 16 wherein the reaction temperature is maintained at from 110–145° C.

References Cited by the Examiner

UNITED STATES PATENTS 2,755,286  7/1956  Bell et al. _____ 260—307

NICHOLAS S. RIZZO, *Primary Examiner.*